United States Patent [19]

Johnson

[11] Patent Number: 5,688,115
[45] Date of Patent: Nov. 18, 1997

[54] SYSTEM AND METHOD FOR REDUCED NOX COMBUSTION

[75] Inventor: Gregory Lynn Johnson, Houston, Tex.

[73] Assignee: Shell Oil Company, Houston, Tex.

[21] Appl. No.: 492,409

[22] Filed: Jun. 19, 1995

[51] Int. Cl.$^6$ ........................................ F23M 3/00
[52] U.S. Cl. ................... 431/9; 431/115; 431/190; 431/278
[58] Field of Search ..................... 431/8, 9, 10, 116, 431/115, 278, 285, 287, 190, 175, 162, 164

[56] References Cited

U.S. PATENT DOCUMENTS

| | | | |
|---|---|---|---|
| 1,513,828 | 11/1924 | Kernohan et al. | |
| 3,013,528 | 12/1961 | Bland | 118/302 |
| 4,217,088 | 8/1980 | Reed | 431/190 |
| 4,257,763 | 3/1981 | Reed | 431/190 |
| 4,533,314 | 8/1985 | Herberling | 431/4 |
| 4,614,490 | 9/1986 | Kiczek et al. | 431/4 |
| 4,643,669 | 2/1987 | Bozai | 431/202 |
| 4,744,962 | 5/1988 | Johnson et al. | 423/235 |
| 4,746,286 | 5/1988 | Shirvill | 431/328 |
| 4,842,509 | 6/1989 | Hasenack | 431/10 |
| 4,888,031 | 12/1989 | Martens | 48/197 |
| 4,969,814 | 11/1990 | Ho et al. | 431/8 |
| 5,002,484 | 3/1991 | Lofton et al. | 432/222 |
| 5,201,650 | 4/1993 | Johnson | 431/9 |
| 5,224,851 | 7/1993 | Johnson | 431/115 |

Primary Examiner—James C. Yeung
Attorney, Agent, or Firm—Mark A. Smith

[57] ABSTRACT

A method is disclosed for reducing NOx pollutants in the combustion of hydrocarbon fuels in a two stage burner. A first stage of combustion is established and maintained passing a stream of combustion air and first stage products of combustion down a centerline of the burner to a second stage downstream therefrom. This second stage is established by arranging an array of fuel tips around the first stage burner, each fuel tip having a fuel jet with a nominal trajectory angled toward the burner centerline and an inert gas jet placed between the burner and the fuel jet which is angled to cross the trajectory of the fuel jet. Fuel is injected into the second stage of the burner through the fuel jet and the inert gas, e.g. steam, is injected through the inert gas jet such that it influences the trajectory of the fuel to a modified fuel trajectory which is moved away from the centerline of the burner. Controlling the injection of the inert gas as a function of the firing rate for the burner allows the modified fuel trajectory to be moved progressively outward from the centerline of the burner across a range of increasingly higher firing rates. This reduces NOx production by moving the introduction of second stage combustion to a cooler and less oxygen rich area of the furnace as the furnace is progressively fired to greater heat outputs. Another aspect of the present invention is a low NOx burner.

22 Claims, 1 Drawing Sheet

SYSTEM AND METHOD FOR REDUCED NOX COMBUSTION

BACKGROUND OF THE INVENTION

The present invention relates to a system and method for reducing pollutants from the combustion of hydrocarbon fuel and, more particularly, to a system and method for controlling combustion in a staged fuel burner to minimize NOx formation as a product of hydrocarbon combustion.

NOx is a common designation representing two oxides of nitrogen, nitric oxide (NO) and nitrogen dioxide ($NO_2$). Together, these compounds react with hydrocarbons in the presence of oxygen and sunlight to form photochemical smog. It is for this reason that environmental concerns and attendant regulatory controls have required efforts to limit the amount of NOx generated by the combustion of hydrocarbon fuels.

Hydrocarbon-fired process heaters used for refinery processes are illustrative of this need and provide the preferred embodiment discussed hereinafter. In such applications the feedstock fuel available is most often unprocessed or minimally processed crude oil and many different hydrocarbon compounds may be present such fuel.

Typical combustion in a burner unit for a process heating furnace would yield combustion products as follows:

$$C_AH_B + O_2 + N_2 \rightarrow CO_2 + H_2O + N_2 + NOx + CO.$$

More specifically to point, the particular mechanism, thermal NOx production, responsible for oxidizing nitrogen in the ambient combustion air can be summarized as follows:

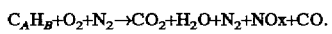

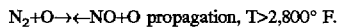

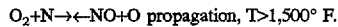

The elevated temperature within the furnace supplies the energy for oxygen molecules to dissociate and, as the temperature rises into the range of 2,800° F. to 3,000° F., the oxygen free radicals have sufficient energy to split bonds within the nitrogen molecules supplied by the combustion air. One of these nitrogen atoms combines with the oxygen and the other is sufficiently reactive to break another oxygen-oxygen bond, thereby forming another NOx molecule and producing another oxygen free radical to further propagate NOx production.

Without pollution controls, such combustion might yield NOx in the range of 0.06 to 0.1 pounds per million Btu fired. Presently available commercial processes can reduce this to about 0.03 pounds per million Btu fired.

However, it is known that NOx reduction can be significantly reduced using staged burners and recycling a portion of the combustion products in the exhaust or flue gas and adding other inert gas, e.g., steam, at the burner to dilute the oxygen concentration presented in the combustion air available for the combustion reaction. A key mechanism in reducing the NOx concentration is the effect that this dilution has on the temperature of the flame within the furnace. Significantly increasing the amount of inert gas in the combustion air increases the amount of gas which must be heated, but does so without correspondingly increasing the amount of oxygen available for combustion. Thus, the heat load drawing on the combustion reaction is higher and the inert gas serves to lower the temperature of the flame within the furnace. This in turn reduces the formation of NOx as a combustion product because the reactions necessary for NOx formation are not favored by the lower reaction temperatures.

However, as discussed above, the NOx reduction is a sensitive function of the temperature of the combustion reaction and is materially influenced within a relatively narrow range. Thermal NOx production increases nearly exponentially once the combustion temperature exceeds a critical temperature in the range of 2,800° F. to 3,000° F. and unmodified combustion materially exceeds this critical temperature while ideal flue gas recirculation produces combustion temperature below this. Thus, higher oxygen concentrations at a constant air/fuel ratio produces a higher reaction temperature, and thereby the NOx concentration within the combustion products, substantially increases. Conversely, insufficient oxygen produces incomplete combustion which increases the concentration of carbon monoxide and other undesirable pollutants and potentially destabilizes the combustion reaction.

The discussion above treats the furnace as a whole, but NOx production is also effectively influenced more regionally within the furnace among stages and with trajectories of fuel, air and inert gases. For instance, it is known that moving the second stage fuel jet trajectory away from the centerline of the burner will cause it to burn in a gas containing lower levels of oxygen than otherwise. These aspects are a function of burner geometry. However, flame stability, particularly at the lower burner rates necessary for start up and/or low process throughput, materially constrain options in designing burner geometry.

Thus, it has been known to inject inert gas on a volumetric basis and to maximize burner geometry. However, using high volumes of inert gas creates both cost and safety issues. Further, burner geometry has been approached from a smile basis, determined by limitations on flame stability at the low end firing rates typical of start-up and low process flow rates, not full load operation. Therefore there is a need for a method and system that can reduce the NOx production of hydrocarbon fired furnaces with a more effective use of injected inert gas, that will operate efficiently across a range of furnace firing rates, and that facilitates flame stability.

SUMMARY OF THE INVENTION

An advantage of the present invention is that low NOx combustion can be maintained over a substantial range of firing rates in a given furnace. Further, this can be accomplished with greater efficiency in that a lower amount of inert gas, e.g., steam, can be used with the same or even greater pollution abatement than results from presently available units. Yet another advantage of the present invention is an opportunity to enhance flame stability in both transient and failure conditions without adversely affecting normal operation of NOx reduction facilities.

Toward providing for these and other advantages, an aspect of the present invention is a method for reducing NOx pollutants in the combustion of hydrocarbon fuels in a two stage burner in which a first stage of combustion is established and maintained passing a stream of combustion air and first stage products of combustion down a centerline of the burner to a second stage. The second stage of combustion is established downstream of the first stage. This second stage is established by arranging an array of fuel tips around the first stage burner, each fuel tip having a fuel jet with a nominal trajectory angled toward the burner centerline and an inert gas jet placed between the burner and the fuel jet which is angled to cross the trajectory of the fuel jet. Fuel is injected into the second stage of the burner through the fuel jet and the inert gas, e.g. steam, is injected through the inert gas jet such that it influences the trajectory of the fuel to a modified fuel trajectory which is moved away from the centerline of the burner. Controlling the injection of the inert gas as a function of the firing rate for the burner allows the modified fuel trajectory to be moved progressively outward from the centerline of the burner across a range of increasingly higher firing rates. This reduces NOx production by moving the introduction of second stage combustion to a cooler and less oxygen rich area of the furnace as the burner is progressively fired to greater heat outputs.

Another aspect of the present invention is a low NOx burner having a furnace housing and a primary fuel stage within a ceramic tile which is supplied with combustion air. A secondary stage burner system provides a plurality of second stage fuel tips forming a concentric array around the centerline and slightly upstream of the outlet of the primary stage burner. In this embodiment, each secondary stage fuel tip has a fuel jet having a nominal trajectory for the fuel which is angled toward the primary stage burner and an inert gas jet positioned between the fuel jet and the primary stage burner and having a nominal trajectory which intersects the nominal trajectory for the fuel.

Yet another aspect of the present invention is a second stage fuel tip for use in a multiple stage burner for burning a fuel in a low NOx combustion. The second stage fuel tip has a fuel tip housing with a longitudinal axis and a fuel jet at the end of the fuel tip housing which is disposed to inject fuel along a first nominal trajectory at an angle to the longitudinal axis of the fuel tip housing.

A fuel conduit within the fuel tip housing communicates with the fuel jet. A high pressure steam port is also disposed, in this embodiment, at the end of the fuel tip to inject steam at a second nominal trajectory, said second nominal trajectory intersecting the first nominal trajectory. A steam supply tube within the fuel tip housing communicates with the high pressure steam port, whereby momentum from the steam expelled through the high pressure steam port is transferred to fuel injected into the furnace through the fuel jet, thereby creating a combined trajectory carrying fuel into the second stage of the furnace at an angle different than the first nominal trajectory defined by the fuel jet orientation.

A BRIEF DESCRIPTION OF THE DRAWINGS

The above brief description as well as further objects, features and advantages of the present invention will be more fully appreciated by reference to the following detailed description of the presently-preferred, but nonetheless illustrative, embodiment of the present invention with reference to the accompanying drawings in which.

A DETAILED DESCRIPTION OF THE ILLUSTRATED EMBODIMENT

Figure 1:
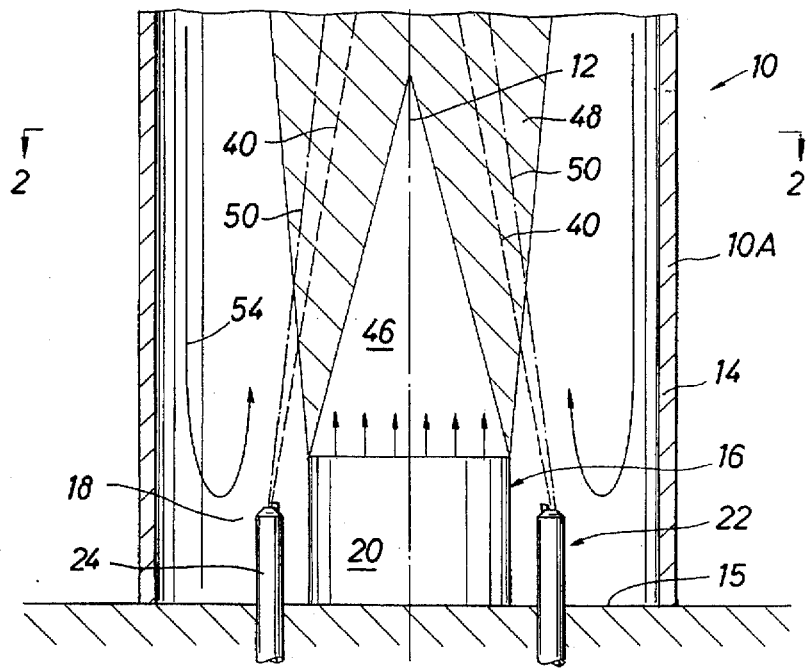
FIG. 1 is a partially cross sectioned side view of a burner system in accordance with the present invention and schematically illustrating the burner fluid mechanics.

FIG. 1 illustrates a multi-stage burner 10 having a centerline 12 within a furnace or burner housing 14 and a furnace floor 15. A first or primary stage burner 16 and a second or secondary stage burner 18 are arranged about the centerline within the burner housing. In this illustrative example the first stage burner is a ceramic tile 20 which is mounted on the furnace floor and supplied with fuel and combustion air. The second stage is provided by an array 22 of secondary stage fuel tips 24 concentrically disposed through the furnace floor about ceramic tile 20. See also FIG. 2.

Figure 3:
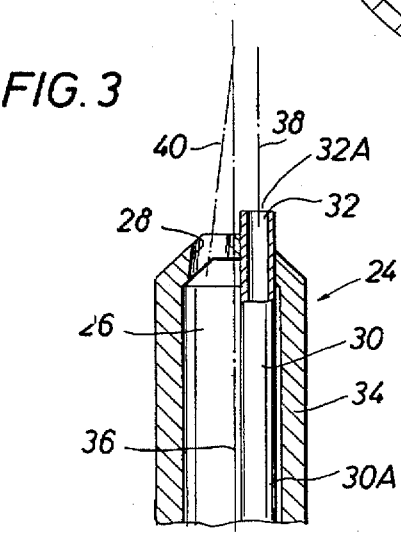
FIG. 3 is a partially cross-sectioned side view of a second stage fuel tip deployed in the embodiment of the present invention illustrated in the burner system of FIG. 1.

Each secondary stage fuel tip 24 pairs a fuel conduit 26 leading to a fuel jet 28 with a corresponding inert gas conduit 30 leading to a inert gas jet 32. Fuel jet 28 has a nominal trajectory 40 angled toward centerline 12 of burner 10 and inert gas jet 32 is positioned between the fuel jet and the burner centerline and has a nominal trajectory 38 for the inert gas which intersects the nominal trajectory 40 of the fuel. Refer also to FIG. 3 which is a partially cross sectioned close-up of secondary stage fuel tip 24.

In the illustrated embodiment, the inert gas is a high pressure steam and fuel tip 24 provides fuel tip housing 34 having a longitudinal axis 36 which is substantially parellel to burner centerline 12. The fuel conduit is formed by the interior of fuel tip housing 34. Further, a steam supply tube 30A within the fuel tip housing provides the inert gas conduit and the inert gas jet is provided by a high pressure steam port 32A which provides for nominal trajectory 38 of the inert gas to be directed substantially parallel to longitudinal axis 36 and burner centerline 12.

Figure 4:
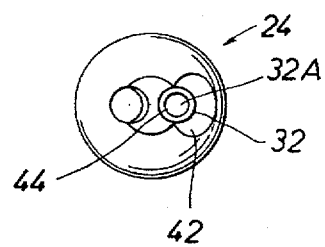
FIG. 4 is a an end view of the second stage fuel tip of FIG. 3 taken along line 4—4 in FIG. 3.

FIG. 4 is a top view of one of secondary stage fuel tips 24, here fitted with a control 42 manipulating a restriction orifice 44 across the end of high pressure steam port 32A.

Figure 2:
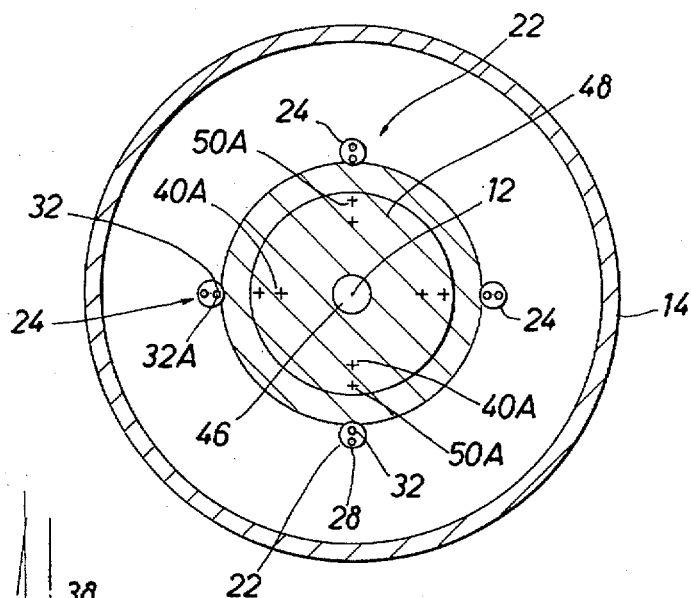
FIG. 2 is a cross sectional view of a schematic view of the burner fluid mechanics of the burner system of FIG. 1 taken along line 2—2 in FIG. 1.

Low NOx combustion of hydrocarbon fuels in accordance with the present invention is illustrated in FIGS. 1-3. Here multi-stage burner 10 is represented by a two stage burner 10A in which a first stage of combustion 46 is established and maintained with ceramic file 20 of first stage burner 16 to pass a stream of combustion air and first stage products of combustion down centerline 12. The second stage of combustion 48 is established downstream of first stage 46 with array 22 of fuel tips 24 arranged around first stage burner 16. Each fuel tip has a fuel jet 28 with a nominal trajectory 40 of fuel angled toward the burner centerline. FIGS. 1 and 2 illustrate second stage combustion 48 in an idealized, schematic manner, in showing operation of burner 10A.

The mixing zone which defines the region of secondary combustion 48 tends to be relatively oxygen rich toward centerline 12 and progressively leaner with further distance from the centerline. At start-up and other low firing rates little or no inert gas is injected and the fuel is injected into the second stage combustion substantially along its nominal trajectory 40. Such low firing rates do not produce the temperatures which propagate significant NOx production and injecting the fuel into a relatively oxygen rich portion of the product stream enhances flame stability without significant detriment to pollution abatement. This safety aspect is further enhanced by limiting the introduction of inert gas under these conditions for which flame stability is a critical parameter. This is particularly true to the use of steam as an inert gas because a water slug accidently introduced at start-up or idle can easily cause the burner to flame-out.

At greater firing rates, fuel continues to be injected into the second stage of the burner through fuel jet 28 and an inert gas such as steam is injected through the inert gas jet 32 at a nominal trajectory which intersects the nominal trajectory 40 of fuel jet 28. At this intersection, the momentum of the inert gas influence the trajectory of the fuel in the combined stream to a modified fuel trajectory 50 which is swept away from centerline 12 of burner 10. Controlling the injection of the inert gas as a function of the firing rate for the burner allows the modified fuel trajectory 50 to be moved progressively outward from the centerline of the burner across a range of increasingly higher firing rates. This reduces NOx production by moving the introduction of second stage combustion 48 to a cooler and less oxygen rich area of the furnace as the burner is progressively fired to greater heat outputs. This is also illustrated in the cross sectional view of FIG. 2 demonstrating a shift from first or nominal fuel trajectory 40A to second or modified fuel trajectory 50A with an increase in burner firing rate from an idle rate to a firing rate in support of capacity throughput. Further, moving the modified fuel trajectory outward from the burner centerline brings this flow closer to the stream of interior flue gas recirculation which is denoted by arrows 54 in FIG. 1. This proximity serves to entrain more flue gas into the stream entering secondary combustion thereby further lowering the available oxygen and reaction temperature to reduce NOx production.

Modified fuel trajectory 50 can be controlled by adjusting the mass, velocity, direction or any combination thereof, for the inert gas in relation to the injected fuel. For example this may be controlled through the mass of steam flowing through the team supply tube or by controlling the velocity of steam by controlling a restricted orifice 42A in the end of high pressure steam port 32A. See FIG. 4. Another alternative is to actually manipulate the angles of the fuel jet and inert gas jet relative to one another.

In one system, e.g., a modified Callidus Technologies L.E. burner, flame stability has been found effective at nominal trajectory 40 of the fuel jet to centerline 12 angle of 5 degrees. However, other burner configurations may alter this angle as a function of other aspects of known geometry. In one embodiment of this system, it was found effective to provide inert gas jet 28 immediately adjacent steam supply tube 30A, conveniently provided on the same fuel tip 24. See FIGS. 3 and 4. However, the fuel jet and the steam port may be separated and it should be understood that the angles of the nominal trajectories of both the fuel jet and inert gas jet may be altered from that illustrated so long as they interface such that momentum transferred from the inert gas will deflect the combined stream away from the centerline of the burner.

Unmodified by the method and apparatus of the present invention, a conventional NOx reduction system as discussed above can effectively reduce the NOx yield of hydrocarbon combustion from a non-abated range of 0.06 to 0.1 pounds per million Btu fired to about 0.03 pounds per million Btu fired. However, modifying such a system to incorporate the present invention can reduce the NOx yield to approximately 0.015 pounds per million Btu fired. Moreover, in doing so, flame stability is not sacrificed in the second stage and is enhanced in the in the primary stage combustion since these results are achievable without injecting steam into the primary stage at all. Further, the overall requirements for steam or other inert gas are reduced by managing the placement of the stream.

Other modifications, changes, and substitutions are intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A method for reducing NOx pollutants in the combustion of hydrocarbon fuels in a two fuel stage burner, said method comprising:
    establishing and maintaining a first stage of combustion and passing a stream of combustion air and first stage products of combustion down a centerline of the burner to a second stage;
    establishing a second stage of combustion downstream from the first stage of combustion and concentrically disposed about and open to the first stage, establishing the second stage further comprising:
        arranging an array of fuel tips around the first stage burner, each fuel tip having a fuel jet with a nominal trajectory angled toward the centerline of the burner and an inert gas jet placed between the burner centerline and the fuel jet which is nominally angled to cross the trajectory of the fuel jet;
        injecting fuel through the fuel jet into the burner; and
        injecting an inert gas through the inert gas jet such that it influences the trajectory of the fuel to a modified fuel trajectory which is moved away from the centerline of the burner.

2. A method for reducing NOx pollution in accordance with claim 1 further comprising controlling the injection of the inert gas as a function of firing rate for the burner such that the modified fuel trajectory is moved progressively outward from the centerline of the burner across a range of increasingly higher firing rates.

3. A method for reducing NOx pollution in accordance with claim 2 wherein controlling the injection of the inert gas as a function of the firing rate of the burner comprises adjusting a restriction orifice across the inert gas jet to control the velocity of the inert gas injected.

4. A method for reducing NOx pollution in accordance with claim 2 wherein controlling the injection of the inert gas as a function of the firing rate of the burner comprises adjusting the mass of the inert gas injected.

5. A method for reducing NOx pollution in accordance with claim 2 further comprising, entraining increasing amounts of internally circulated flue gas into the second stage of combustion as the firing rate of the burner increases and the modified fuel trajectory moves outward toward a flow path of flue gas internally recirculated within the furnace.

6. A method for reducing NOx pollution in accordance with claim 1 wherein injecting an inert gas comprises injecting high pressure steam.

7. A method for reducing NOx pollution in accordance with claim 2 wherein injecting an inert gas comprises injecting high pressure steam and further comprising enhancing safety by injecting no steam into the first stage of combustion to enhance flame stability of the first stage of combustion.

8. A method for reducing NOx pollution in accordance with claim 7 wherein the normal trajectory of the fuel jet is conducive to flame stability at all firing speeds such that a loss of steam pressure will not cause flame instability.

9. A method for reducing NOx pollutants in the combustion of hydrocarbon fuels in a two stage furnace which provides for internal flue gas recirculation, said method comprising:
    establishing and maintaining a first stage of combustion and passing a stream of combustion air and first stage products of combustion to down a centerline of the burner to a second stage; and
    establishing a second stage of combustion downstream from the first stage of combustion and concentrically disposed about and open to the first stage, establishing the second stage further comprising:

arranging an array of fuel tips around the first stage burner, each fuel tip having a fuel jet with a nominal trajectory angled toward the centerline of the burner and a high pressure steam port placed between the burner and the fuel jet which is nominally angled to cross the nominal trajectory of the fuel jet;

injecting fuel through the fuel jet into the burner;

injecting high pressure steam through the steam port such that it influences the trajectory of the fuel to a modified fuel trajectory which is moved away from the centerline of the burner; and controlling the injection of the steam as a function of function of firing rate for the burner such that the modified fuel trajectory is moved progressively outward from the centerline of the burner across a range of increasingly higher firing rates.

10. A method for reducing NOx pollution in accordance with claim 9 wherein arranging an array of fuel tips around the first stage burner further comprises providing a nominal trajectory of the fuel jet at about a 5 degree angle to the centerline of the burner and providing a nominal trajectory for the steam which is substantially parallel to the centerline of the burner.

11. A method for reducing NOx pollution in accordance with claim 9 wherein controlling the injection of the steam as a function of the firing rate of the burner comprises adjusting a restriction orifice across the steam port to control the velocity of the steam injected.

12. A method for reducing NOx pollution in accordance with claim 9 wherein controlling the injection of the steam as a function of the firing rate of the burner comprises adjusting the mass of the high pressure steam injected.

13. A low NOx burner comprising:

a burner housing providing for internal flue gas recirculation;

a primary stage burner having a centerline and an outlet within the furnace housing;

a secondary stage burner system comprising:

a plurality of second stage fuel tips forming a concentric array around the centerline and slightly upstream of the primary stage burner, each secondary stage fuel tip comprising:

a fuel jet having a initial trajectory for the fuel which is angled toward the primary stage burner; and an inert gas jet between the fuel jet and the primary stage burner and having a normal trajectory for the inert gas which intersects the initial trajectory for the fuel;

whereby inert gas injected through the inert gas jets of the secondary stage fuel tips influences the trajectory of the fuel to a modified fuel trajectory which is moved away from the centerline of the burner.

14. A low NOx burner in accordance with claim 13 wherein the inert gas jet is a steam jet.

15. A low NOx burner in accordance with claim 13 further comprising a control system for increasing the momentum of the inert gas stream relative to the fuel jet stream as the fire rate of the furnace is increases.

16. A low NOx burner in accordance with claim 15 wherein the control system manipulates a restriction orifice to increase the velocity of the inert gas injected from the second stage fuel tip.

17. A low NOx burner in accordance with claim 15 wherein the control system controls the mass of inert gas injected from the second stage fuel tip.

18. A multiple stage furnace for burning a fuel in a low NOx combustion utilizing steam, said furnace comprising:

a burner having a centerline; and a second stage fuel tip comprising:

a fuel tip housing having a longitudinal axis;

a fuel jet at the end of the fuel tip housing and disposed to inject fuel along a first nominal trajectory at an angle to the burner centerline;

a fuel conduit within the fuel tip housing communicating with the fuel jet;

a high pressure steam port disposed to inject steam at a second nominal trajectory, said second nominal trajectory intersecting the first nominal trajectory; and a steam supply tube within the fuel tip housing communicating with the high pressure steam port;

whereby the fuel tip is disposed to transfer momentum from the steam expelled through the high pressure steam port to fuel injected into the furnace through the fuel jet, thereby creating a combined trajectory carrying fuel into the furnace at an angle different than the first nominal trajectory established by the fuel jet.

19. A furnace in accordance with claim 18 wherein the fuel conduit is the interior wall of the fuel tip housing.

20. A furnace in accordance with claim 19 wherein the first nominal trajectory of the fuel jet is disposed substantially at a 5 degree angle to the burner centerline.

21. A furnace in accordance with claim 20 wherein the second nominal trajectory of the high pressure steam port is substantially parallel to the longitudinal axis of the fuel tip and substantially parallel to the burner centerline.

22. A furnace in accordance with claim 21 further comprising a restriction orifice in the high pressure steam port.

* * * * *